United States Patent [19]
Otrhalek et al.

[11] 3,884,964
[45] May 20, 1975

[54] PIGMENT DISPERSANT IN AQUEOUS SLURRIES

[75] Inventors: Joseph V. Otrhalek, Dearborn, Mich.; Gunther H. Elfers, Mutterstadt, Germany

[73] Assignee: BASF Wyandotte Corporation, Wyandotte, Mich.

[22] Filed: Jan. 31, 1974

[21] Appl. No.: 438,336

[52] U.S. Cl. ............. 260/486 R; 106/309; 162/162; 260/42.21; 260/42.52
[51] Int. Cl. ............................................. C07c 69/54
[58] Field of Search ................................ 260/486 R

[56] References Cited
UNITED STATES PATENTS
2,765,229  10/1956  McLaughlin ............................ 92/21
2,999,038  9/1961  Drannan .............................. 117/155

*Primary Examiner*—Lorraine A. Weinberger
*Assistant Examiner*—Paul J. Killos
*Attorney, Agent, or Firm*—Bernhard R. Swick; Joseph D. Michaels; Robert E. Dunn

[57]  ABSTRACT

A neutralized solution of polymer prepared by the free radical polymerization of an alpha, beta unsaturated acid, e.g., acrylic acid with small amounts of an alkyl ester an alpha, beta unsaturated acid and allyl alcohol when added to an aqueous pigment slurry at a rate of less than one percent polymer solids by weight of pulp present yields improved pigment dispersion having significantly lower viscosity.

8 Claims, No Drawings

PIGMENT DISPERSANT IN AQUEOUS SLURRIES

BACKGROUND OF THE INVENTION

1. Field of the Invention

This invention relates to the control of pigment dispersion slurries which are more pumpable by the use of a solution of a neutralized copolymer having a high alpha, beta unsaturated carbonyl acid content.

2. Description of the Prior Art

The problem of pigment control and dispersion in preparation of paper, paints, inks and the like has previously been recognized.

Among the prior art U.S. Pat. No. 2,399,489 discloses the use of sodium carbonate to reduce the viscosity of clay containing pigment dispersion for use in papermaking. The patent further discloses polyphosphates such as sodium hexa-meta-phosphate have been employed.

A later patent, U.S. Pat. No. 3,021,257, discloses that the amount of pigment deposited on paper during the papermaking process from a given amount of pigment dispersion can be increased by simultaneously adding with the pigment or post-treating the pigment with water-soluble anionic polymer, e.g., an acrylamide:acrylic acid copolymer wherein 80 to 95 mole percent of the polymer is acrylamide. U.S. Pat. No. 3,234,076 discloses the use of acrylamide-diallyl amine copolymers for the same purpose. Still another patent, U.S. Pat. No. 3,509,021, discloses the use of mixtures of polyacrylamide and aminoplast resin in a weight ratio of 1:9 to 9:1 to achieve the same results.

In accordance with this invention there is provided a composition for controlling the dispersion and viscosity of pigments in an aqueous slurry consisting essentially of an alkali neutralized terpolymer produced by the free radical polymerization of from about 60 to about 88 parts by weight of at least one alpha, beta unsaturated acid containing 3 to 4 carbon atoms, from about 6 to about 28 parts by weight of at least one alkylate of an alpha, beta unsaturated acid containing 3 to 4 carbon atoms, said alkylate containing from 1 to 18 carbon atoms, and from about 4.5 to about 20 parts by weight of allyl alcohol, the total of said parts being 100. Also provided is a method for controlling the viscosity of said pigment in an aqueous slurry comprising adding to said slurry an aqueous solution containing from about twenty to about fifty weight percent polymer solids of the above described polymer composition and in an amount of polymer solids of up to one percent by weight of pigment in the slurry.

DESCRIPTION OF THE PREFERRED EMBODIMENTS

The terpolymer of this invention is an alkali neutralized free radical polymerized polymer containing an alpha, beta unsaturated acid and alkylate of an alpha, beta unsaturated acid and allyl alcohol. More particularly, the acid is alpha, beta unsaturated and contains 3 to 4 carbon atoms. Included within this group of acids are acrylic acid, methacrylic acid, crotonic acid and isocrotonic acid with the first two acids being the preferred acids. The amount of acid employed in preparing the terpolymer of this invention on a total of 100 parts by weight basis will be from about 60 to about 88 parts and, more preferably, from about 75 to about 88 parts.

The alkylates contained in the terpolymer of this invention are esters of the acids employed herein and again the preferred acids are acrylic and methacrylic acids. The alkyl portion contains from 1 to 18 carbon atoms and, more preferably, from 1 to 10 carbon atoms and includes linear or normal alkyl, branched alkyl, hydroxyalkyl and cycloaklyl. Illustrative of the alkyl groups are methyl, hydroxymethyl ethyl, hydroxyethyl, propyl, isopropyl, butyl, 2-ethylhexyl, cyclohexyl, nonyl, octyl, dodecyl and stearyl. Based on 100 parts the alkylated acid is present in the terpolymer in an amount from about 6 to about 28 parts and, more preferably, from about 6 to about 15 parts.

The third component of the terpolymer is allyl alcohol which is present, based on 100 parts, in an amount from about 4.5 parts to about 20 parts and preferably from about 6 to about 15 parts by weight.

The terpolymer is prepared by free radical polymerization in an aqueous medium at a temperature just above the freezing temperature up to the reflux temperature of the aqueous reaction mixture, more practical operating temperatures are in the range of about 50°C. to about 100°C., a range of about 60°C. to about 90°C. being particularly preferred. Polymerization in accordance with this invention can be carried out at atmospheric to autogenous pressures. The polymerization is generally conducted for a period of 2 to 8 hours and a period of 3 to 5 hours is very satisfactory. The foregoing details, catalyst discussed below and other details are well known to those skilled in the polymer arts and for the sake of brevity need not be discussed further.

It has been found preferable to prepare an aqueous solution of acid, ester and alcohol and charge the solution incrementally to the reaction vessel along with incremental additions of an aqueous solution of the catalyst at such a rate so as to evenly maintain the desired reaction temperature. The solids content of the reaction system can range from about 20 to about 50 percent by weight. Thirty percent has been found to be very satisfactory from the point of view of low enough viscosity to permit easy handling of the resulting polymer solution.

Any of the compounds known to generate free radicals and which are soluble at effective concentrations in the aqueous polymerization medium may be used as the polymerization catalyst in practicing this invention. Examples of useful polymerization catalysts include the alkali metal and ammonium persulfates, perborates, or percarbonates, hydrogen peroxide, organic peroxides such as benzoyl peroxide, cumene hydroperoxide, tertiary butyl peroxide, tertiary butyl perbenzoate, acetyl benzoyl peroxide, tertiary butyl peracetate and tertiary butyl peroxyisobutyrate. Ammonium, potassium and sodium persulfates are particularly preferred. Organic peroxides may be used in combination with these inorganic peroxidic catalysts. Azonitrile compounds such as described in U.S. Pat. No. 2,471,959 can be used also as a polymerization catalyst for the polymers of this invention.

Generally, the proportion of polymerization catalyst is in the range of 0.1 percent to 8.0 percent based on the weight of acid and alkylate charged, and preferably from 1 percent to 3 percent.

The catalyst can also be a peroxidic catalyst activated with a reducing agent to provide a redox system. Examples of useful reducing agents include water-soluble bisulfites, such as sodium metabisulfite, sulfites, hydrosulfites and thiosulfates. The redox system may be further activated by the presence of polyvalent metal ions, e.g., ferrous ions at concentrations of the order of magnitude of several parts per million, or with tertiary amines which are soluble in the reaction mixture.

The proportion of reducing agent included in the polymerization catalyst combination ordinarily ranges up to 3 percent based on the weight of the monomers and preferably is in the range of 0.02 percent to 1 percent on this basis. In the inorganic redox system of persulfate and bisulfite, the weight ratio can vary from 1 to 10 parts of persulfate per part by weight of bisulfite.

The polymerization product has an acid pH and can be neutralized with alkaline materials such as ammonia or ammonium hydroxide, mono- and dialkylamines containing 1 to 6 carbon atoms in each alkyl group and alkali metal hydroxides, e.g., potassium hydroxide or sodium hydroxide, that form water-soluble neutralization products. Preferably, the neutralizing agent will be ammonia, ammonium hydroxide, potassium hydroxide or sodium hydroxide. The neutralizing agent is added to the polymer solution until a final pH of about 7.5 to about 8.5 is obtained. Thus neutralized, the polymer solution has improved storage stability and possible metal corrosion problems in the storage container are minimized.

The resulting polymer solution is adjusted as necessary to have a polymer total solids content of between about twenty and about fifty weight percent. The polymer solution is a true solution in comparison to the polymer solutions known in the prior art which are only emulsions. It is believed that the high acid content of the invented polymers materially contributes to this condition.

The process of the present invention is applicable to both inorganic pigments and fillers as they are known in industry. For convenience these materials will be collectively referred to as pigment. Pigments, as used herein, included but are not limited to titanium dioxide, calcium carbonate, chrome yellow, zinc oxide, talc, agalite, pearl filler, blanc fix, barytes, clay such as china clay, ball clay, kaolinite, montmorillonite and the like, ultramarine, ochres, and the like. Additionally included are anionic organic pigments exemplified by barium lithol red, benzidine orange and so forth.

Aqueous slurries of pigments are used in the manufacture of paper, paint, ink and the like to impart color, body or feel, and to modify the specific gravity of the product. In order to avoid the problem of dispersing the pigment in the final product and/or provide for automatic processing of the end product, it is often desirable to use the pigment in the form of an aqueous dispersion. Moreover, it has been found desirable to a high pigment content, i.e., 50 to 75 or 80 weight percent, to avoid dealing with excessive amounts of water. However, at these high concentrations the dispersion often becomes very viscous and difficult to handle or move by pumping and the like.

To avoid the foregoing problems, it has been found advantageous to add to the various slurries small amounts of the previously described aqueous polymer solution of this invention. The amount to be added will vary according to the amount of pigment to be dispersed. It has been found that even under the most adverse condition an amount by weight of polymer solids in the polymer solution equal to one percent of the pigment present is sufficient to disperse the pigment present. The actual amount to be added, of course, will vary depending on the source and type of pigment as well as the amount of viscosity reduction sought.

The following examples are included to illustrate the preparation of the dispersants of the present invention and the use thereof but are not to be considered limiting. Unless otherwise noted, all parts are by weight and all temperatures are in degrees centigrade.

EXAMPLE 1

A 1-liter, three-neck flask equipped with stirrer, thermometer, addition funnels, reflux condenser and heat exchange equipment was charged with 236 g. water. A mixture of 207 g. acrylic acid, 23 g. butyl acrylate, and 11.5 g. allyl alcohol (solution I) and 115 g. of a 6 percent aqueous potassium persulfate solution (solution II) were added concurrently to the water at 80°–85°C. over 3½ hours. The reaction product was then neutralized with 175 g. 28 percent aqueous ammonia. A clear viscous solution was obtained (Brookfield viscosity: 1,800 cps). The product is satisfactory as a pigment dispersant.

EXAMPLE 2

A 5-liter, three-neck flask equipped with stirrer, thermometer, addition funnels, reflux condenser and heat exchange equipment was charged with 1,230 g. water. A mixture of 1,035 g. acrylic acid, 115 g. butyl acrylate, and 115 g. allyl alcohol (solution I) and 575 g. of a 6 percent aqueous potassium persulfate solution (solution II) were added concurrently to the water at 80°–85°C. over 3 hours. The reaction product was then neutralized with 1,150 g. 50 percent aqueous sodium hydroxide solution. A clear viscous solution having a total active solids of 30 percent was obtained, which exhibited a pH of 7.7, Brookfield viscosity 3,040 cps (Spindle No. 4, 60 r.p.m.), and a density of 1.25. The product is satisfactory as a pigment dispersant.

EXAMPLE 3

Following the procedure of Example 1 a dispersant was prepared based on 82 parts of acrylic acid, 9 parts of methyl methacrylate and 9 parts of allyl alcohol. The total solids of the polymer solution was 30 percent and the solution was neutralized with a 50 percent sodium hydroxide solution. The solution has a viscosity of 2,560 cps.

A standard test pigment dispersion was prepared by mixing in a mixture of spray-dried calcium carbonate (trademark PURECAL O "SD") and water in a 70:30 weight ratio. With no dispersant present the mixture was so stiff that its viscosity could not be determined. The Brookfield viscosity of a 70 percent by weight dispersion of calcium carbonate to which had been added 0.75 percent of the terpolymer of this example was 2,450 cps. The dispersion is suitable for paint use.

Similar results will be obtained when kaolinite is the pigment.

EXAMPLE 4

Following the procedure of Example 1 a dispersant was prepared based on 64 parts of acrylic acid, 27 parts of hydroxy methacrylate and 9 parts of allyl alcohol. The polymer solution solids and neutralization was the same as in Example 3. The solution viscosity was 2,648 cps. The Brookfield viscosity of the standard 70 percent dispersion of calcium carbonate described in Example 3 to which had been added 0.75 percent of the terpolymer dispersant of this example was 2,950 cps.

Similar results will be obtained when titanium dioxide is the pigment.

Still other useful dispersants of this invention are prepared as indicated in Table I below.

Table I

| Example No. | Acid (a) | Parts Acid | Alkylate Monomer (c) | Parts Alkylate | Parts Allyl Alcohol | Neutralizing Agent (b) |
|---|---|---|---|---|---|---|
| 5 | A | 80 | E | 15 | 5 | C |
| 6 | M | 75 | G | 10 | 15 | C |
| 7 | M | 82 | F | 9 | 9 | D |
| 8 | A | 82 | G | 10 | 8 | C |

(a) A = Acrylic
   M = Methacrylic
(b) C = Ammonium hydroxide, 28% solution
   D = Sodium hydroxide, 50% solution
(c) E = 2-ethyl hexyl acrylate
   F = butyl acrylate
   G = ethyl acrylate The foregoing examples and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. A composition for controlling the viscosity of pigments in an aqueous slurry consisting essentially of an alkali neutralized terpolymer produced by the free radical polymerization in water of
   a. from about 60 to 88 parts by weight of at least one alpha, beta unsaturated carboxylic acid containing 3 to 4 carbon atoms.
   b. from about 6 to 28 parts by weight of at least one alkylate of an alpha, beta unsaturated carboxylic acid containing 3 to 4 carbon atoms, said alkylate containing from 1 to 18 carbon atoms, and
   c. from about 4.5 to about 20 parts by weight of allyl alcohol.
   the total of said parts being 100.

2. The composition of claim 1 wherein the acid is acrylic acid or methacrylic acid.

3. The composition of claim 2 wherein the acid is acrylic acid.

4. The composition of claim 1 wherein the alkylate is an alkyl acrylate or an alkyl methacrylate.

5. The composition of claim 4 wherein the alkylate is methyl methacrylate.

6. The composition of claim 5 wherein the acid is acrylic acid.

7. The composition of claim 1 containing from about 75 to about 88 parts of an alpha, beta unsaturated carboxylic acid, from about 6 to about 15 parts of an alkylate of an alpha, beta unsaturated acid and from about 6 to about 15 parts of allyl alcohol.

8. The composition of claim 7 containing about 82 parts acrylic acid, about 9 parts methyl methacrylate and about 9 parts allyl alcohol.

* * * * *